United States Patent [19]

Wenninger

[11] 4,156,372

[45] May 29, 1979

[54] STEERING SHAFT ASSEMBLY

[75] Inventor: Josef Wenninger, Vorsfelde, Fed. Rep. of Germany

[73] Assignee: Volkswagenwerk Aktiengesellschaft, Wolfsburg, Fed. Rep. of Germany

[21] Appl. No.: 921,702

[22] Filed: Jul. 3, 1978

Related U.S. Application Data

[62] Division of Ser. No. 773,800, Mar. 3, 1977.

[30] Foreign Application Priority Data

Mar. 26, 1976 [DE] Fed. Rep. of Germany ....... 2612829

[51] Int. Cl.² .............................................. B62D 1/18
[52] U.S. Cl. .................................... 74/492; 64/11 R; 403/393
[58] Field of Search ................. 74/492, 493; 64/11 R; 403/393

[56] References Cited

U.S. PATENT DOCUMENTS

| 2,406,895 | 9/1946 | Olson | 403/393 X |
| 2,523,465 | 9/1950 | Graham | 403/393 X |
| 3,472,093 | 10/1969 | Tenniswood | 74/492 |
| 3,752,007 | 8/1973 | Blondeleau | 74/492 |
| 3,926,069 | 12/1975 | Wenninger | 74/492 |
| 3,960,031 | 6/1976 | Chometon et al. | 74/492 |
| 4,014,219 | 3/1977 | Feustel | 74/492 |

*Primary Examiner*—Allan D. Herrmann
*Attorney, Agent, or Firm*—Brumbaugh, Graves, Donohue & Raymond

[57] ABSTRACT

A motor vehicle steering shaft assembly having two complementary steering shaft pieces adapted to be connected to the vehicle steering gear and steering wheel, respectively. Each shaft piece has an end portion arranged in adjacent, overlapping relationship with the end portion of the other shaft piece. The two shaft pieces are connected by at least two independent, torque-transmitting plug connections which are axially spaced relative to each other along the overlapping end portions. Each of the plug connections includes projections or "plugs," attached and extending parallel to one of the shaft pieces, and corresponding receptacles, adapted to receive the projections, attached to the other shaft piece. As a result of this construction the two shaft pieces of the steering shaft assembly may be disconnected upon application of a predetermined axial force, but the steering shaft assembly will not bend upon application of a transverse force thereto.

3 Claims, 7 Drawing Figures

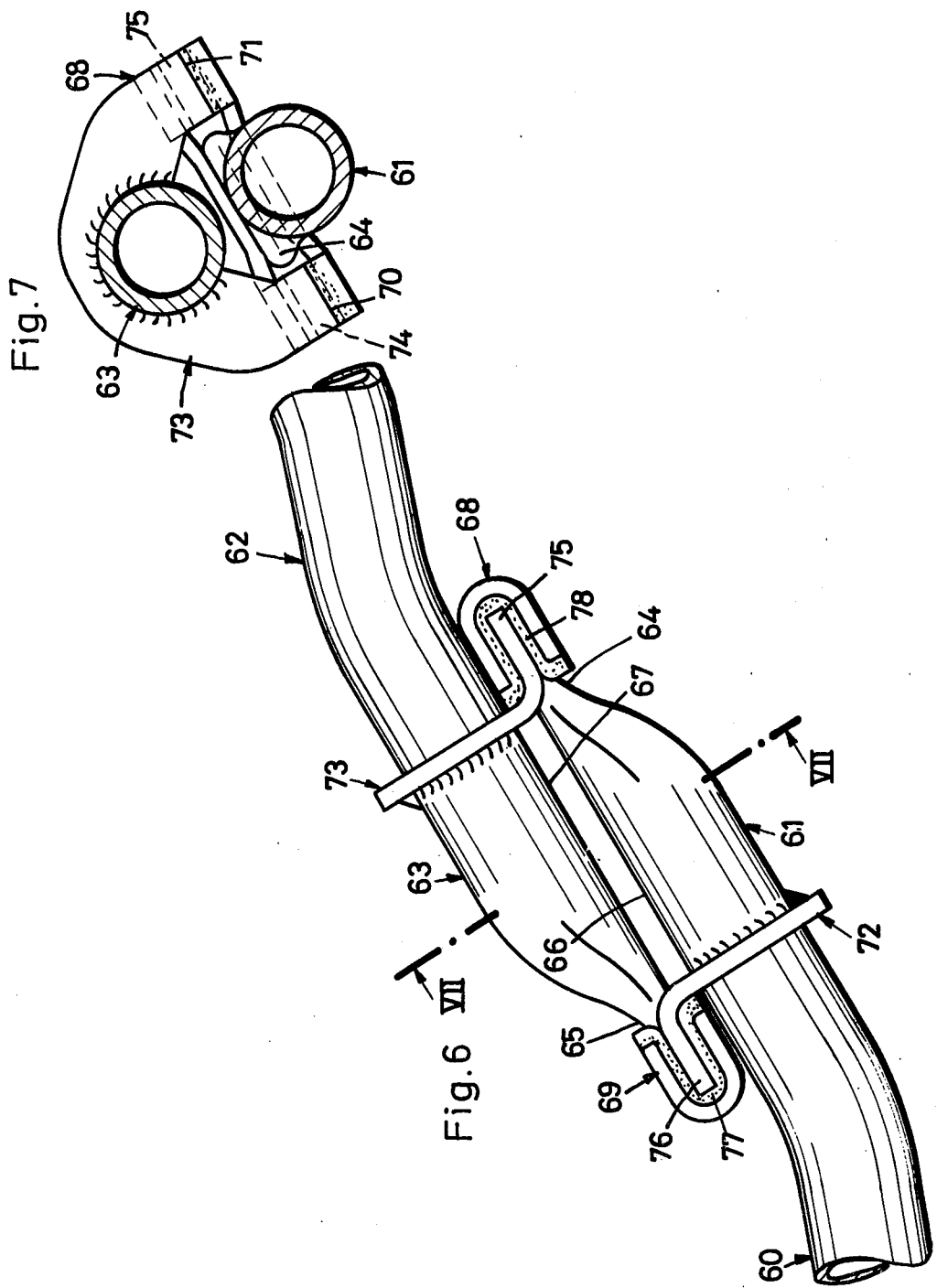

STEERING SHAFT ASSEMBLY

This is a division of application Ser. No. 773,800, filed Mar. 3, 1977.

BACKGROUND OF THE INVENTION

The present invention relates to a steering shaft assembly for motor vehicles such as automobiles or the like. More particularly, the invention concerns a steering shaft assembly comprising two complementary, interconnected shaft pieces adapted to be connected to the vehicle steering gear and steering wheel, respectively, which shaft pieces are arranged to be disconnected upon application of a predetermined axial force.

It is known to construct motor vehicle steering shaft assemblies with a divided, "breakaway" steering shaft to eliminate the possibility of penetration of the steering column into the region of the vehicle operator upon collision. Five references which disclose this type of arrangment are the U.S. Pat. Nos. 3,472,093; 3,760,649 and 3,752,007; and the West German patent publications (DOS) Nos. 1,927,173 and 2,106,963.

While the known safety steering shaft assemblies of the above-noted type are designed to transmit steering commands (i.e., torque) without distortion from the steering wheel to the steering gear, they may be troublesome if acted upon by bending moments originating with the steering gear. This is particularly true for shaft assemblies which comprise one or more universal joints permitting a plurality of shaft sections to be connected together in an articulated manner. In such cases the shafts connected to the steering wheel and steering gear, respectively, are not aligned on a common axis so that high momentary torques, which frequently occur during operation of the vehicle, are converted into severe bending moments.

It is the purpose of the present invention to provide a safety steering shaft assembly of the type having shaft connections which are disengaged on impact, such that the shaft assembly is capable of withstanding bending moments of the kind just described.

SUMMARY OF THE INVENTION

Thus, in accordance with the invention, there is provided a motor vehicle steering shaft assembly having two complementary steering shaft pieces adapted to be connected to the vehicle steering gear and steering wheel, respectively. Each shaft piece has an end portion arranged in adjacent, overlapping relationship with the end portion of the other shaft piece. The two shaft pieces are connected by at least two independent, torque-transmitting plug connections which are axially spaced relative to each other along the overlapping end portions. Each of the plug connections includes projections or "plugs", attached and extending parallel to one of the shaft pieces, and corresponding receptacles, adapted to receive the projections, attached to the other shaft piece. As a result of this construction the two shaft pieces of the steering shaft assembly may be disconnected upon application of a predetermined axial force, but the steering shaft assembly will not bend upon application of a transverse force thereto.

In one preferred form of embodiment of the invention, which was found to minimize the number of separate, individual parts, the projections of one of the plug connections are supported on one of the steering shaft pieces while the projections of the other plug connection are supported on the other steering shaft piece.

For a better understanding of the present invention, together with other and further objects, reference is made to the following description, taken in conjunction with the accompanying drawing, and its scope will be pointed out in the appended claims.

BRIEF DESCRIPTION OF THE DRAWING

FIG. 6 is a side view showing two steering shaft assembly pieces, with their associated plug connections, in accordance with another preferred embodiment of the present invention.

FIG. 7 is a cross-section of FIG. 6.

DESCRIPTION OF THE PREFERRED EMBODIMENTS

Figure 1:
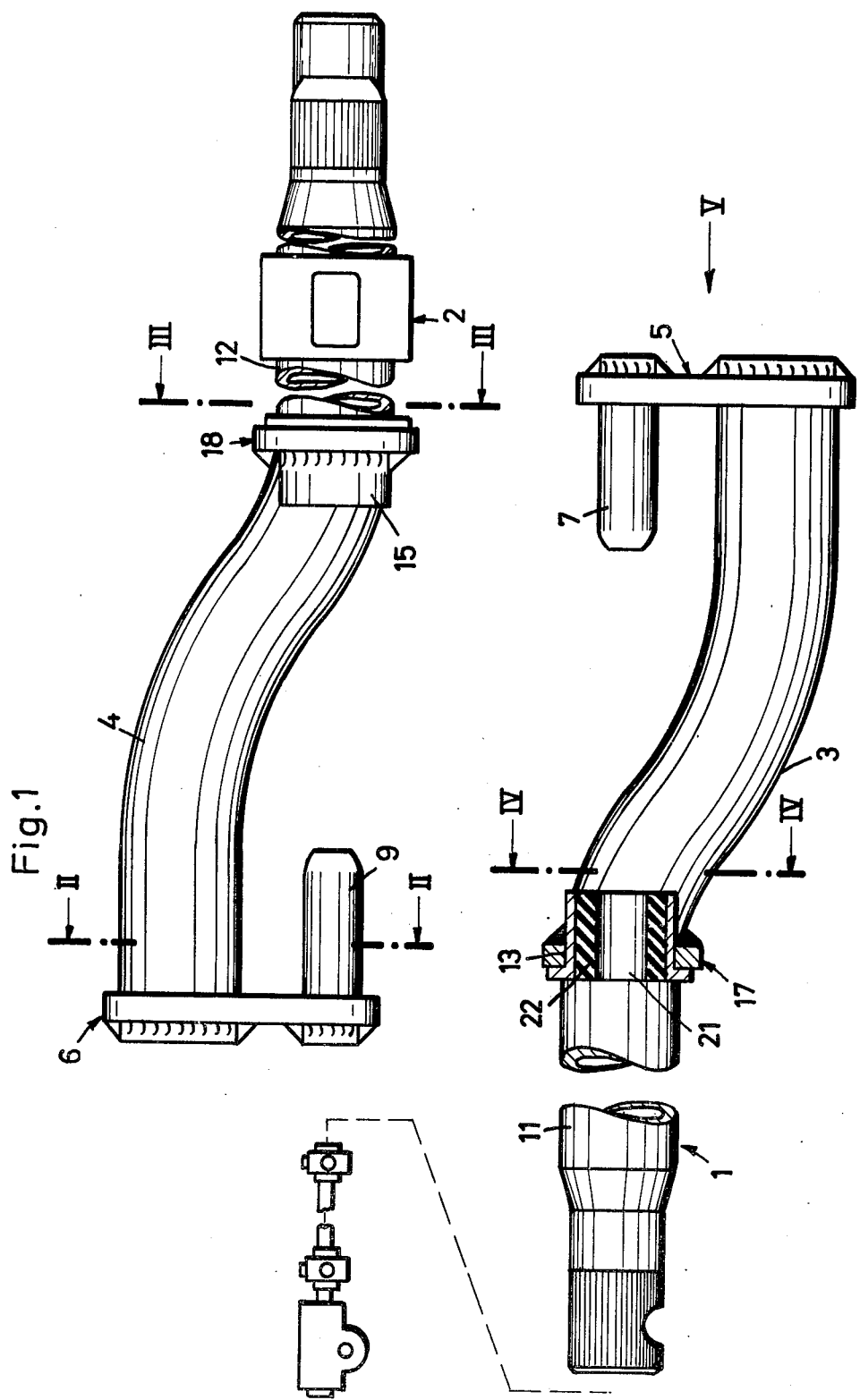
FIG. 1 is a side view showing two steering shaft assembly pieces, with their associated plug connections, in accordance with one preferred embodiment of the present invention.
Figure 2:
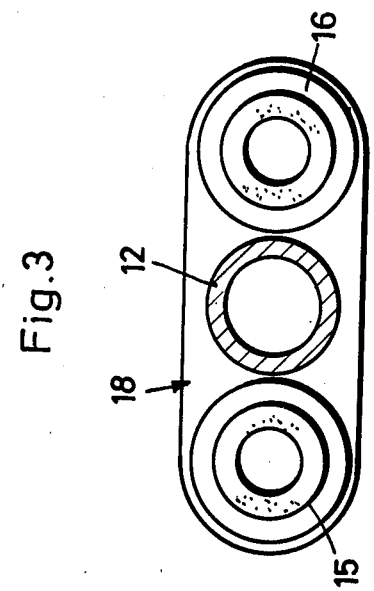
FIGS. 2-5 are axial views, partly in cross-section, showing the steering shaft pieces of FIG. 1 at lines II—II, III—III, IV—IV and V—V, respectively.

In the embodiment shown in FIGS. 1 to 5 the steering gear-side steering shaft piece is designated by the reference numeral 1 and the steering wheel-side steering shaft piece by the reference numeral 2. The steering gear may be connected with the steering shaft piece 1 in a known manner by means of universal joints as well as by one or more further steering shaft pieces that form an articulated shaft section, for example. The upper steering shaft piece 2 is connected to the steering wheel in a manner which is likewise well known in the art.

The two steering shaft pieces 1 and 2 are provided with offset end portions 3 and 4 which, in the assembled state of the shaft assembly, overlap and extend parallel to each other. To the free end of each offset end portions 3 and 4 is welded a transversely extending bearing plate 5 and 6, respectively, which supports one or more pin-like projections, in this example two each: 7, 8 and 9, 10, respectively. The projections are directed backwards—i.e., in a direction toward the offset portion—and thus in the direction of the straight portions 11 and 12 of the steering shaft pieces 1 and 2, respectively.

Figure 3:
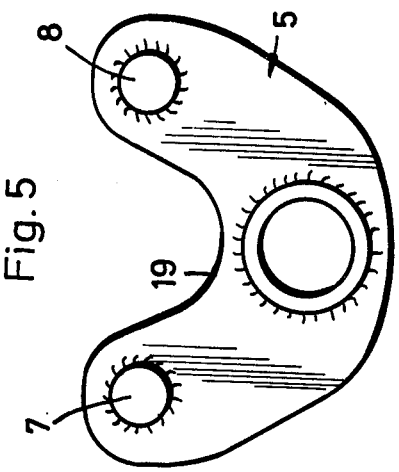
Figure 4:
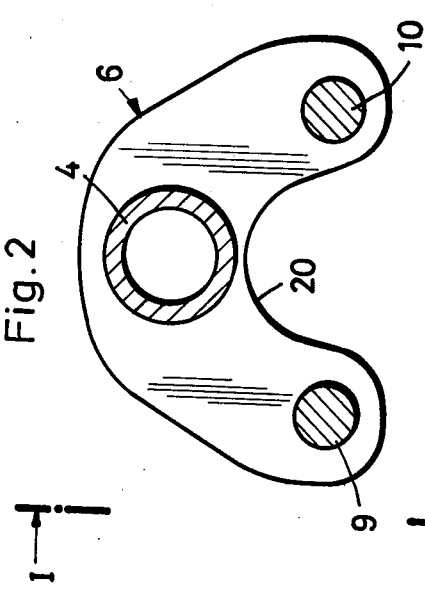
Figure 5:
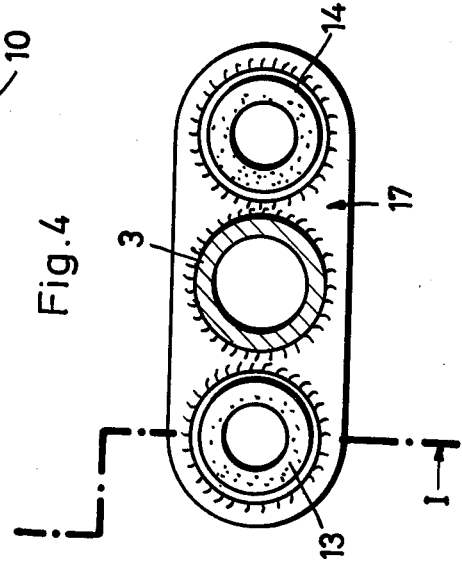

As may best be seen in FIGS. 2-5, the projections 7, 8 and 9, 10 cooperate with receptacles 13, 14 and 15, 16, respectively, which are supported by bearing plates 17 and 18. The plates 17 and 18 are rigidly fixed, in this case welded, at a point in the zone of the offset of their respective steering shaft pieces 1 and 2. In this embodiment the two projections 7, 8 and 9, 10, respectively, are arranged on opposite sides of a clearance 19 and 20 in their associated bearing plate 5 and 6 permitting the end portion of the corresponding other steering shaft piece to pass by. Therefore, in the assembled state of the steering shaft assembly the projections associated with one steering shaft piece are located in a common plane with the other shaft piece. In this way, as is shown in FIGS. 3 and 4, the plates 17 and 18 may have a simple, essentially rectangular shape with openings, placed in one plane, for accommodation of the associated, supporting shaft piece and for formation of the receptacles for the projections. As may be seen in FIG. 1 in the illustration of the steering shaft piece 1 in cross section, the receptacles themselves may be extended axially by sleeve-like inserts 21. These inserts may be lined with rubber bushings 22 serving to dampen oscillations and noise.

Because the two plug connections are independent of each other and axially spaced, the steering shaft assembly forms a lever arm capable of absorbing bending moments. The separation of the plug connections upon impact is not restrained, however, because, as in the steering shaft assemblies of the prior art, forces acting on the shaft assembly in the direction of its axis will cause the projections 7 to 10 to slide out from their associated receptacles 13 to 16.

In the embodiment shown in FIGS. 6 and 7, the steering gear-connected shaft piece is designated by the reference numeral 60, its offset end portion by 61, the steering wheel-connected shaft piece by 62 and its offset end portion by 63. As may be seen especially in FIG. 7, the two shaft pieces consist of tubular material. This tubular material is flattened at the free ends of the offset end portions to provide flattened zones 64 and 65 extending asymmetrically relative to the axes of the tubular material. In particular, surfaces of the flattened zones 64 and 65 form substantially straight continuations of those surfaces 66 and 67 of the offset end portions 61 and 63 which face each other.

On the flattened free ends of the steering shaft pieces 60 and 62 are fixed U-shaped, transverse members 68 and 69 which, as illustrated in FIG. 7 for the transverse member 68, form recesses 70 and 71 to the sides of the flattened zone 64 for holding projections attached to the respective other steering shaft piece.

As may be seen in FIG. 6, each steering shaft piece 60 and 62 is provided at some distance from the free end of the associated offset end portion with a plate 72 and 73, respectively. Each plate is prevented from axial displacement with respect to its associated shaft piece, for example by welding, and has two projections directed away from the flattened zone of its associated steering shaft piece on the level of the flattened zone of the other steering shaft piece. In FIG. 7 may be discerned the two projections 74 and 75 of the bearing plate 73 obtained by bending back portions of the plate. These projections extend freely into the recesses 70 and 71, respectively, in such a manner that, in case of impact, they can slide out with relative ease. The other bearing plate 72 is designed and attached to its associated shaft piece 60 in the same manner as the bearing plate 73. FIG. 6 shows only one of its projections 76.

In order to reduce noise transmission and to prevent rattling, it may be advisable to provide the receptacles in the U-shaped transverse members 68 and 69 with resilient linings 77 and 78, as may be seen in FIG. 6.

The embodiment of the steering shaft assembly shown in FIGS. 6 and 7 is distinguished by especially simple manufacture.

While there have been described what are believed to be the preferred embodiments of the invention, those skilled in the art will recognize that various changes and modifications may be made thereto without departing from the spirit of the invention, and it is intended to claim all such embodiments as fall within the true scope of the invention.

I claim:

1. A steering shaft assembly for a motor vehicle comprising:
   (a) two complementary shaft pieces adapted to be connected to the vehicle steering gear and steering wheel, respectively, said two shaft pieces having adjacent, overlapping end portions with a flat profile at each free end; and
   (b) at least two independent, torque-transmitting plug connections which are axially spaced relative to each other along said end portions and which connect said shaft pieces together, each of said plug connections including projection means attached and extending parallel to one of said shaft pieces, and corresponding receptacle means, adapted to receive said projection means, attached to the other of said shaft pieces; said projection means of one of said plug connections being attached to one of said shaft pieces and said projection means of another of said plug connections being attached to the other of said shaft pieces;
   whereby said two shaft pieces of said steering shaft assembly may be disconnected upon application of a predetermined axial force, but said steering shaft assembly will not bend upon application of a transverse force thereto.

2. The steering shaft assembly defined in claim 1, wherein said receptacle means comprises an element, having a U-shaped cross-section, arranged on an associated flattened free end of each one shaft piece, said element providing recesses on opposite sides of said associated free end for projections which extend from a bearing plate rigidly connected to the other shaft piece.

3. The steering shaft assembly defined in claim 1, wherein each of said shaft pieces comprises a hollow tube, and wherein said flat profile at the end portion of each shaft piece is a flattened out tube section having a surface which is a substantially straight continuation of the surface, facing said other shaft piece, of the unflattened section of said end portion.

* * * * *